US012560122B2

(12) United States Patent
Davis et al.

(10) Patent No.: US 12,560,122 B2
(45) Date of Patent: *Feb. 24, 2026

(54) FUEL-COOLED ENGINE COMPONENT(S)

(71) Applicant: RTX Corporation, Farmington, CT (US)

(72) Inventors: Dustin W. Davis, Marlborough, CT (US); Lance L. Smith, West Hartford, CT (US); Won-Wook Kim, Bloomfield, CT (US)

(73) Assignee: RTX Corporation, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/088,506

(22) Filed: Mar. 24, 2025

(65) Prior Publication Data

US 2025/0223923 A1 Jul. 10, 2025

Related U.S. Application Data

(60) Continuation of application No. 18/519,583, filed on Nov. 27, 2023, now Pat. No. 12,258,906, which is a (Continued)

(51) Int. Cl.
*F02C 7/18* (2006.01)
*F02C 7/22* (2006.01)
*F23R 3/40* (2006.01)

(52) U.S. Cl.
CPC ................. *F02C 7/18* (2013.01); *F02C 7/22* (2013.01); *F23R 3/40* (2013.01);

(Continued)

(58) Field of Classification Search
CPC .... F02C 7/20; F02C 7/22; F02C 7/222; F02C 7/224; F23R 3/36
See application file for complete search history.

(56) References Cited

U.S. PATENT DOCUMENTS

| | | | |
|---|---|---|---|
| 2,647,368 A | 8/1953 | Triebbnigg | |
| 3,049,872 A | 8/1962 | Johnson | |

(Continued)

FOREIGN PATENT DOCUMENTS

| | | | |
|---|---|---|---|
| CN | 104832219 | 1/2017 | |
| JP | 2017180303 | 10/2017 | |

(Continued)

OTHER PUBLICATIONS

"Liquid Hydrogen as a Propulsion Fuel, 1945-1959", https://history.nasa.gov/SP-4404/ch8-3.htm.

*Primary Examiner* — Thuyhang N Nguyen
(74) *Attorney, Agent, or Firm* — Getz Balich LLC

(57) ABSTRACT

An assembly is provided for a turbine engine with a flowpath. This assembly includes a fuel source and an engine component. The engine component forms a peripheral boundary of the flowpath. The engine component includes a component internal passage. The engine component is configured to receive fuel from the fuel source. The engine component is configured to crack at least some of the fuel within the component internal passage thereby cooling the engine component and providing at least partially cracked fuel. The assembly is configured to direct the at least partially cracked fuel into the flowpath for combustion.

19 Claims, 9 Drawing Sheets

Related U.S. Application Data division of application No. 17/196,635, filed on Mar. 9, 2021, now Pat. No. 11,859,535.

(52) U.S. Cl.
CPC .... *F05D 2220/323* (2013.01); *F05D 2240/12* (2013.01); *F05D 2240/36* (2013.01); *F05D 2260/232* (2013.01); *F05D 2300/11* (2013.01); *F05D 2300/1432* (2013.01)

(56) References Cited

U.S. PATENT DOCUMENTS

| | | | | |
|---|---|---|---|---|
| 3,204,408 | A | | 9/1965 | Vincent |
| 3,313,103 | A | | 4/1967 | Johnson |
| 3,600,890 | A | * | 8/1971 | White ...................... F02C 7/224 |
| | | | | 415/114 |
| 3,734,639 | A | | 5/1973 | Short |
| 4,047,877 | A | | 9/1977 | Flanagan |
| 4,896,499 | A | * | 1/1990 | Rice ........................ F02C 6/003 |
| | | | | 60/39.182 |
| 5,000,004 | A | | 3/1991 | Yamanaka |
| 5,003,766 | A | | 4/1991 | Paul |
| 5,122,033 | A | | 6/1992 | Paul |
| 5,461,864 | A | | 10/1995 | Betta |
| 6,712,602 | B2 | | 3/2004 | Kang |
| 8,057,163 | B2 | | 11/2011 | Thompson, Jr. |
| 8,196,407 | B2 | | 6/2012 | Harris |
| 8,333,075 | B2 | | 12/2012 | York |
| 10,364,679 | B2 | | 7/2019 | Zelesky |
| 11,333,073 | B2 | * | 5/2022 | Kawai ...................... F02C 7/18 |
| 12,258,906 | B2 | * | 3/2025 | Davis ........................ F02C 7/18 |
| 2006/0156729 | A1 | | 7/2006 | Sprouse |
| 2008/0080978 | A1 | | 4/2008 | Zimmerman |
| 2008/0145694 | A1 | | 6/2008 | Bucci |
| 2010/0229560 | A1 | | 9/2010 | Harris |
| 2011/0030381 | A1 | * | 2/2011 | Sordyl ..................... F02C 3/16 |
| | | | | 60/773 |
| 2011/0056184 | A1 | | 3/2011 | Sisco |
| 2016/0109134 | A1 | * | 4/2016 | Suzuki ................... F23R 3/005 |
| | | | | 60/734 |
| 2017/0307210 | A1 | | 10/2017 | Hirano |
| 2018/0180289 | A1 | | 6/2018 | Lavertu, Jr. |
| 2019/0209997 | A1 | * | 7/2019 | Modroukas .............. F02C 7/22 |
| 2019/0345873 | A1 | | 11/2019 | Ito |
| 2020/0018482 | A1 | | 1/2020 | Ito |
| 2020/0032676 | A1 | | 1/2020 | Nose |
| 2020/0032712 | A1 | | 1/2020 | Ito |

FOREIGN PATENT DOCUMENTS

| | | |
|---|---|---|
| JP | 2019015179 | 1/2019 |
| WO | 9523914 | 9/1995 |

* cited by examiner

FUEL-COOLED ENGINE COMPONENT(S)

This application is a continuation of U.S. patent application Ser. No. 18/519,583 filed Nov. 27, 2023, which claims priority to U.S. patent application Ser. No. 17/196,635 filed Mar. 9, 2021, which is hereby incorporated herein by reference in its entirety.

BACKGROUND OF THE DISCLOSURE

1. Technical Field

This disclosure relates generally to an engine and, more particularly, to cooling one or more components within the engine.

2. Background Information

An engine such as a gas turbine engine includes various internal components subject to relatively high temperatures. To reduce or prevent thermally induced material degradation and/or thermally induced internal stresses, the internal components may be cooled with cooling air; e.g., relatively cool compressed air. While known air cooling techniques have various benefits, there is still room in the art for improvement. There is a need in the art therefore for enhance engine component cooling techniques. There is also a need in the art for advancements in alternative fuels to hydrocarbon fuels to reduce engine emissions, etc.

SUMMARY OF THE DISCLOSURE

According to an aspect of the present disclosure, an assembly is provided for a turbine engine with a flowpath. This assembly includes a fuel source and an engine component. The engine component forms a peripheral boundary of the flowpath. The engine component includes a component internal passage. The engine component is configured to receive fuel from the fuel source. The engine component is configured to crack at least some of the fuel within the component internal passage thereby cooling the engine component and providing at least partially cracked fuel. The assembly is configured to direct the at least partially cracked fuel into the flowpath for combustion.

According to another aspect of the present disclosure, another assembly is provided for a turbine engine with a flowpath. This assembly includes a fuel source and an engine component. The engine component forms a peripheral boundary of the flowpath. The engine component includes a component internal passage. The engine component is configured to receive fuel from the fuel source and flow the fuel within the component internal passage for cooling the engine component. The assembly is configured to direct the fuel used for cooling the engine component from the engine component into the flowpath for combustion. The fuel directed into the flowpath is or otherwise includes hydrogen gas.

According to another aspect of the present disclosure, another assembly is provided for a turbine engine with a flowpath. This assembly includes a fuel source, a turbine vane and an annular combustor. The turbine vane includes a vane internal passage. The annular combustor includes a combustion chamber and a combustor inner wall. The combustor inner wall includes an inner wall internal passage. The assembly is configured to direct fuel from the fuel source sequentially through the vane internal passage and the inner wall internal passage to cool the turbine vane and the combustor inner wall. The assembly is configured to direct the fuel used for cooling the turbine vane and the combustor inner wall into the combustion chamber for combustion.

According to another aspect of the present disclosure, another assembly is provided for an engine. This assembly includes a fuel source, an engine component and a fuel injector. The engine component includes a component internal passage. The engine component is configured to receive fuel from the fuel source. The engine component is configured to crack at least some of the fuel within the component internal passage thereby cooling the engine component and providing at least partially cracked fuel. The fuel injector is configured to receive the at least partially cracked fuel and direct the at least partially cracked fuel into an internal volume for combustion.

According to another aspect of the present disclosure, another assembly is provided for an engine. This assembly includes a fuel source, an engine component and a fuel injector. The engine component includes a component internal passage. The engine component is configured to receive fuel from the fuel source and flow the fuel within the component internal passage for cooling the engine component. The fuel injector is configured to receive the fuel used for cooling the engine component and direct the fuel used for cooling the engine component into an internal volume for combustion. The fuel used for cooling the engine component received by the fuel injector is or otherwise includes hydrogen gas.

According to another aspect of the present disclosure, a method is provided for operating an engine. During this method, fuel is directed into an internal passage of an engine component. At least some of the fuel within the internal passage of the engine component is cracked to provide at least partially cracked fuel, where the cracking of the at least some of the fuel cools the engine component. The at least partially cracked fuel is directed into an internal volume within the engine for combustion.

According to another aspect of the present disclosure, a method is provided for operating an engine. During this method, fuel is directed into an internal passage of an engine component. The fuel flows within the internal passage of the engine component to cool the engine component. The fuel used for cooling the engine component is directed into an internal volume within the turbine engine for combustion, where the fuel directed into the flowpath for combustion is or otherwise includes hydrogen gas.

According to another aspect of the present disclosure, a method is provided. During this method, fuel is directed through a first internal passage of a first component in an aircraft airframe and a second internal passage of a second component in a turbine engine. Heat energy is transferred between the first component and the fuel. Heat energy is transferred out of the second component into the fuel. The fuel is directed into a flowpath of the turbine engine for combustion, where the fuel directed into the flowpath is or otherwise includes gaseous hydrogen.

According to another aspect of the present disclosure, a method is provided. During this method, fuel is directed from a fuel source to a first internal passage of a first component in an aircraft airframe and a second internal passage of a second component in a turbine engine, where the fuel directed from the fuel source includes at least one of ammonia and/or hydrogen ($H_2$). Heat energy is transferred between the first component and the fuel. Heat energy is transferred out of the second component into the fuel. The fuel is directed into a flowpath of the turbine engine for combustion.

The engine component may be configured to crack at least some of the fuel within the component internal passage to provide at least partially cracked fuel. The at least partially cracked fuel may include the hydrogen gas.

The annular combustor may also include a combustor outer wall that circumscribes the combustor inner wall. The combustor outer wall may include an outer wall internal passage. The assembly may be configured to direct additional fuel from the fuel source through the outer wall internal passage to cool the combustor outer wall. The assembly may be configured to direct the additional fuel used to cool the combustor outer wall into the combustion chamber for combustion.

At least one component of the assembly may be configured to crack at least some of the fuel flowing therethrough to provide at least partially cracked fuel. The assembly may be configured to direct the at least partially cracked fuel into the combustion chamber for combustion. The at least one component of the assembly may be configured as or otherwise include the turbine vane or the combustor inner wall.

The at least partially cracked fuel may include hydrogen gas.

The fuel may be or otherwise include ammonia. The at least partially cracked fuel may include hydrogen gas and nitrogen gas.

The engine component may include a catalytic material at least partially lining the component internal passage. The catalytic material may be selected to facilitate the cracking of the at least some of the fuel within the component internal passage.

The engine component may include material that at least partially forms the component internal passage. The material may be or include at least one of nickel (Ni), iron (Fe), ruthenium (Ru) and/or platinum (Pt).

The fuel directed into the component internal passage may be or otherwise include liquid fuel. The engine component may be configured to vaporize the liquid fuel to provide vaporized fuel. The engine component may be configured to crack at least some of the vaporized fuel to provide the at least partially cracked fuel.

The fuel directed into the component internal passage may be or otherwise include vaporized fuel. The engine component may be configured to crack at least some of the vaporized fuel to provide the at least partially cracked fuel.

The engine component may be configured as or otherwise include a vane.

The engine component may be configured as or otherwise include a flowpath wall.

The engine component may be configured as or otherwise include a blade outer air seal.

The assembly may also include a combustor. This combustor may include a combustion chamber, where the combustion chamber may form part of the flowpath. The assembly may be configured to direct the at least partially cracked fuel into the combustion chamber for combustion.

The combustor may include a fuel injector. The fuel injector may be configured to direct the at least partially cracked fuel into the combustion chamber for combustion.

The combustor may include the engine component. The engine component may be configured as a combustor wall. The combustor wall may include one or more fuel injection orifices configured to direct the at least partially cracked fuel into the combustion chamber for combustion.

The assembly may also include a turbine vane adjacent the combustor. The turbine vane may include a vane internal passage that fluidly couples the fuel source with the component internal passage. The engine component may be configured as an inner wall of the combustor.

The assembly may also include an airframe component. This airframe component may include an airframe internal passage that is fluidly coupled with the fuel source and the component internal passage.

The fuel directed into the internal passage may be or otherwise include liquid hydrogen.

The fuel directed into the internal passage may be or otherwise include the hydrogen gas.

A flowpath within the turbine engine may be or otherwise include the internal volume.

The engine component may form a peripheral boundary of the flowpath within the turbine engine.

The engine may be configured as or otherwise include a turbine engine.

The first internal passage may be fluidly coupled with and upstream of the second internal passage.

The first internal passage may be fluidly coupled with and downstream of the second internal passage.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
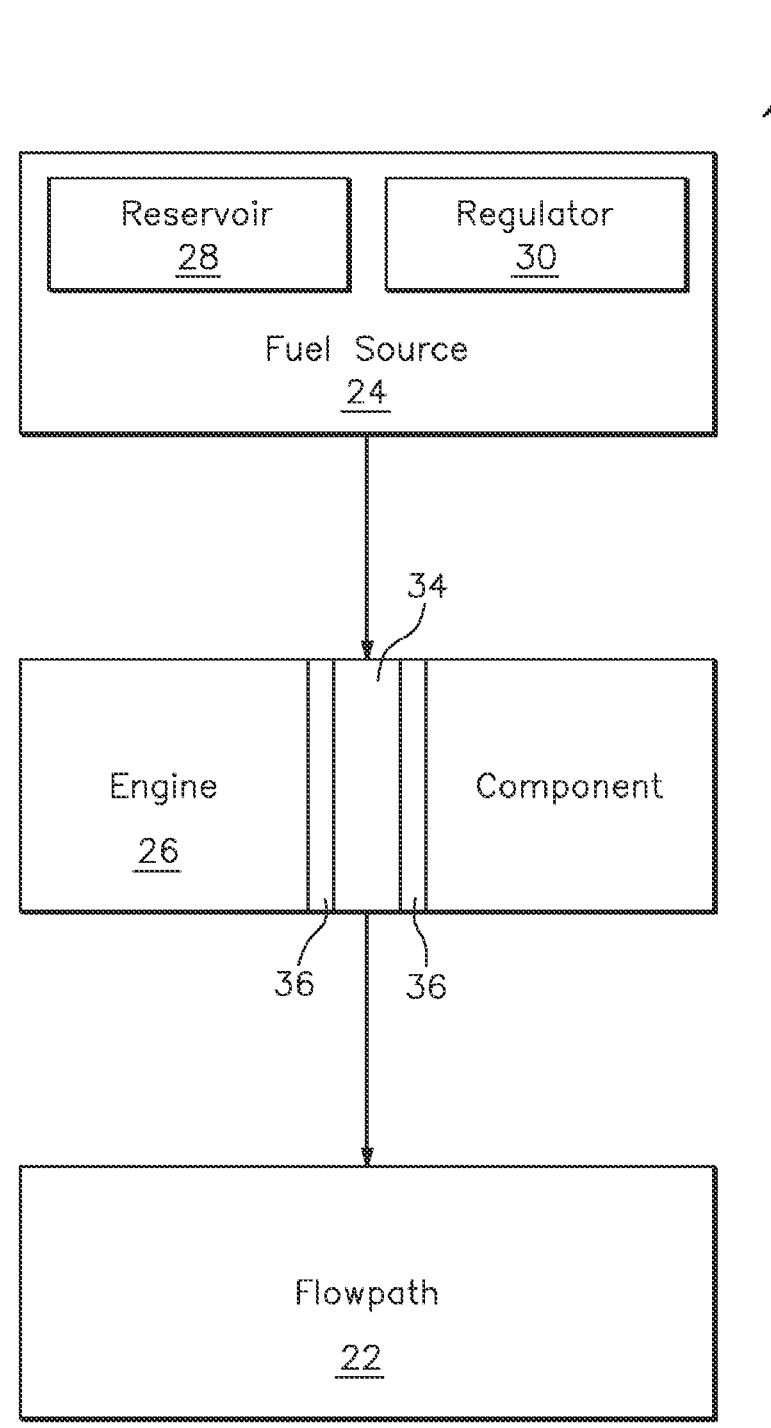
FIG. 1 is a schematic illustration of an assembly for an engine.

FIG. 1 schematically illustrates an assembly 20 for an engine such as a gas turbine engine with at least one flowpath 22; e.g., a core flowpath, a gas path, etc. This turbine engine assembly 20 includes a fuel source 24 and at least one fuel-cooled engine component 26.

The flowpath 22 may include one or more (e.g., serially arranged) fluidly coupled passages, chambers, plenums and/ or any other internal volumes that collectively form a pathway for fluid flow (e.g., gas flow) within the turbine engine. The flowpath 22 may extend within and/or through any one or more sections of the turbine engine. The flowpath 22 may include, for example: a passage within a compressor section of the turbine engine; a pre-diffuser passage, a diffuser plenum and/or a combustion chamber within a combustor section of the turbine engine; and a passage within a turbine section of the turbine engine. The flowpath 22 may also include a passage within a fan section of the turbine engine, a passage within an exhaust section of the turbine engine and/or a passage in a supplemental thrust section (e.g., an augmentor section) of the turbine engine. The present disclosure, however, is not limited to the foregoing exemplary flowpath configurations.

The fuel source 24 is configured to provide fuel to the engine component 26 during turbine engine operation. The fuel source 24 may also be configured to store the fuel during turbine engine operation and/or while the turbine engine is non-operational (e.g., before and/or after turbine engine operation).

The fuel stored and/or provided by the fuel source 24 may be a non-hydrocarbon fuel (e.g., hydrocarbon-free fuel) and/or a non-coking fuel. The fuel, for example, may be or otherwise include ammonia (e.g., liquid or gaseous $NH_3$), hydrogen (e.g., liquid or gaseous $H_2$) or any other combustible composition that includes, for example, hydrogen (H). The present disclosure, however, is not limited to the foregoing exemplary fuels.

The fuel source 24 of FIG. 1 includes a fuel reservoir 28 and a fuel regulator 30. The fuel reservoir 28 may be configured as or otherwise include a container; e.g., a tank, a cylinder, a pressure vessel, a bladder, etc. The fuel reservoir 28 is configured to contain and hold a quantity of the fuel. The fuel regulator 30 may be configured as or otherwise include a pump and/or a valve. The fuel regulator 30 is configured to control flow of the fuel from the fuel reservoir 28 to one or more downstream components of the turbine engine. The fuel regulator 30 of FIG. 1, for example, directs (e.g., pumps) the fuel out from the fuel reservoir 28 to at least the downstream engine component 26.

Figure 2:
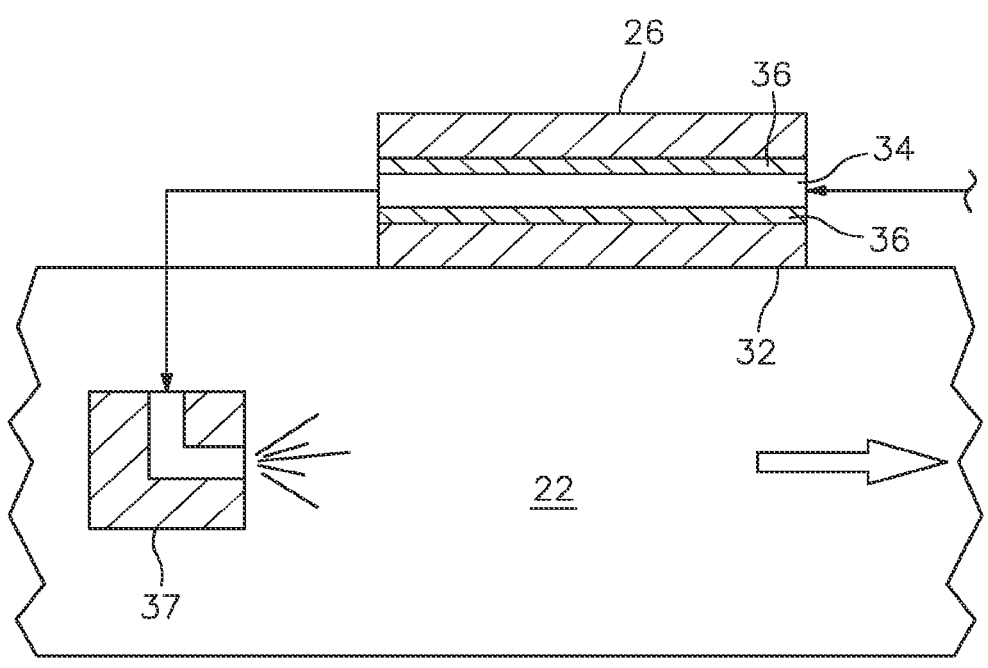
FIG. 2 is a schematic illustration of a portion of the turbine engine assembly with a fuel-cooled engine component and a fuel injector.
Figure 3:
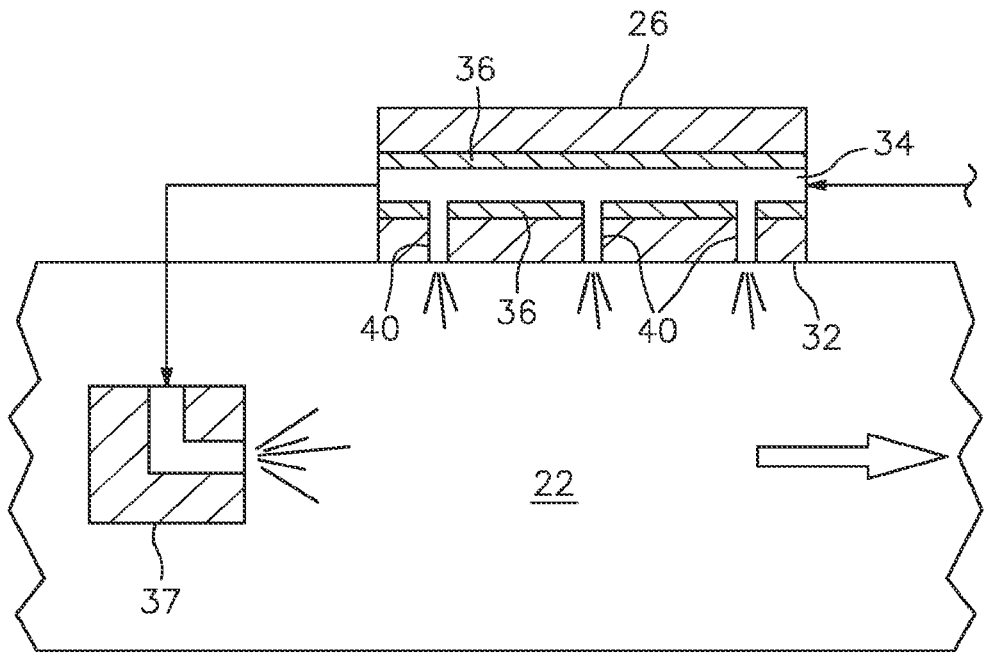
FIG. 3 is a schematic illustration of a portion of the turbine engine assembly with another fuel-cooled engine component and the fuel injector.

The engine component 26 may be, may include or may be part of any cooled component or structure in the turbine engine. This engine component 26 may be arranged adjacent or otherwise proximate the flowpath 22 within the turbine engine. The engine component 26, for example, may be configured to form a peripheral boundary 32 of the flowpath 22 (e.g., one or more surfaces forming the flowpath 22) within the turbine engine; e.g., see FIGS. 2 and 3. Examples of the engine component 26 include, but are not limited to, an airfoil, a vane (e.g., a turbine vane), a strut, a blade outer air seal (BOAS) and a flowpath wall. Examples of the flowpath wall may include, but are not limited to, a combustor wall, a diffuser case, an exhaust liner, a platform and a shroud. The present disclosure, however, is not limited to the foregoing exemplary engine component configurations.

During turbine engine operation, the engine component 26 may be exposed to relatively high temperature gases flowing through the flowpath 22 and/or relatively high heat fluxes associated with (e.g., produced by) the flowpath gases. To prevent or reduce effects of thermally induced material degradation and/or thermally induced internal stresses to the engine component 26, the engine component 26 includes at least one internal passage 34; e.g., an internal cooling passage. This internal passage 34 extends within (e.g., through) the engine component 26, and is fluidly coupled with the fuel source 24. The engine component 26 is thereby configured to receive the fuel from the fuel source 24 (e.g., the fuel reservoir 28 via the fuel regulator 30), and direct the fuel within/through the internal passage 34 for cooling the engine component 26.

During cooling of the engine component 26, heat energy may transfer from material of the engine component 26 to the fuel within the internal passage 34 through conduction and/or convection. This heat energy transfer reduces the heat energy in the engine component 26 and thereby reduces the temperature of (e.g., cools) the engine component 26, while increasing the energy of the fuel within the internal passage 34. The flux of energy into the fuel may be associated with one or more processes such as, but not limited to, (1) a temperature change of the fuel, (2) phase change of the fuel and (3) cracking (e.g., decomposition) of the fuel.

The fuel may enter the engine component 26 and, for example, its internal passage 34 in a liquid phase (e.g., liquid $NH_3$, etc.). The flux of energy into this liquid fuel may increase the temperature of the fuel; e.g., heat the fuel. When the temperature of the liquid fuel reaches a first temperature (e.g., a vaporization temperature), the flux of energy into the liquid fuel may cause at least some (or all) of the fuel to vaporize into vaporized fuel (e.g., gaseous $NH_3$, etc.). The flux of energy into the vaporized fuel may further increase the temperature of the fuel. When the temperature of the vaporized fuel reaches a second temperature (e.g., a cracking temperature), the flux of energy into the vaporized fuel may cause at least some (or all) of the fuel to crack (e.g., decompose), for example via an endothermic reaction, into at least partially (or completely) cracked fuel (e.g., gaseous $H_2$ and gaseous $N_2$, etc.). By facilitating the foregoing processes, the turbine engine assembly 20 is operable to increase heat transfer between the engine component 26 and the fuel and, thus, provide enhance engine component cooling. By contrast, if the fuel was only heated and/or vaporized for example, the flux of energy from the engine component 26 to the fuel may be limited.

To aid and/or facilitate in the fuel cracking process, the engine component 26 may be constructed from a catalytic material 36. Alternatively, at least a portion or all of the internal passage 34 may be lined with the catalytic material 36. For example, the engine component 26 may include a catalytic liner for the internal passage 34. In another example, a wall of the internal passage 34 may be lined with a catalytic coating. Examples of the catalytic material 36 may include, but are not limited to, nickel (Ni), iron (Fe), ruthenium (Ru) and platinum (Pt). The present disclosure, however, is not limited to the foregoing exemplary catalytic materials.

The turbine engine assembly 20 of FIG. 1 is configured to direct at least some or all of the fuel used for cooling the engine component 26 (e.g., the at least partially or completely cracked fuel) into the flowpath 22 for combustion. For example, referring to FIG. 2, the turbine engine assembly 20 may also include one or more fuel injectors 37 (one shown in FIG. 2 for ease of illustration). Each of these fuel injectors 37 may be configured to receive the fuel used for cooling the engine component 26 (e.g., the at least partially or completely cracked fuel) from the engine component 26, and direct (e.g., inject) that fuel into the flowpath 22 (e.g., the combustion chamber, an exhaust duct and/or an augmentor duct) for combustion. In another example, referring to FIG. 3, the engine component 26 may include one or more perforations 40; e.g., through-holes, nozzle orifices, fuel injection orifices, etc. These perforations 40 may fluidly couple the internal passage 34 with the flowpath 22 (e.g., the combustion chamber, the exhaust duct and/or the augmentor duct). The perforations 40 may thereby direct (e.g., inject) at least some of the partially or completely cracked fuel into the flowpath 22 for combustion. Such perforations 40 may also facilitate staged combustion within the flowpath 22.

By using the fuel for at least dual purposes to cool the engine component 26 and then combusting that fuel within the flowpath 22, the turbine engine assembly 20 may increase turbine engine efficiency. In particular, since the heat energy removed from the engine component 26 for cooling is at least partially captured by the fuel and that fuel is then directed back into the flowpath 22 for combustion, at least some of the heat energy that originally heats the engine component 26 is returned to the flowpath 22 for conversion into work. Enthalpy that is removed from the flowpath 22 via heating the engine component 26 and then removed from the engine component 26 via the cooling process may thereby be at least partially reintroduced into the flowpath 22 by the coolant fuel which is subsequently burned. By contrast, air cooling an engine component may decrease turbine engine efficiency since a portion of air that would otherwise be used for combustion is repurposed for cooling. Furthermore, air cooling may reduce flowpath temperature (e.g., by directing relatively cool air into a relatively hot gas flow) and, thus, reduce the work potential of the turbine engine.

Directing the coolant fuel (e.g., the at least partially or completely cracked fuel such as a combination of gaseous $H_2$ and gaseous $N_2$, or a combination of gaseous $H_2$, gaseous $N_2$ and gaseous $NH_3$) into the flowpath 22 for combustion may significantly increase the volumetric flow rate within the flowpath 22 as compared to, for example, directing traditional hydrocarbon fuel. The $N_2$, that was originally bound in the fuel and elevated in pressure by pumping a liquid rather than compressing a gas, increases the power output for a given energy input compared to a hydrocarbon fuel. Alternatively, for a desired fixed power output, using the coolant fuel may reduce compression design requirements of the compressor section.

In addition to the foregoing, directing the at least partially (e.g., 50%, 60%, 70%, 80% or more) cracked fuel into the flowpath 22 for combustion may have benefits over directing (e.g., 50%, 60%, 70%, 80% or more) uncracked fuel into the flowpath 22 for combustion. For example, gaseous $H_2$ may be easier to combust within the flowpath 22 than vaporized (non-cracked) $NH_3$.

Using an alternative (e.g., non-hydrocarbon) fuel such as $NH_3$ can provide various benefits in addition to those discussed above. For example, $NH_3$ can be heated to a relatively high temperature without significant negative effects. Thus, $NH_3$ can be used in relatively high temperature environments for cooling prior to combustion as described above. By contrast, in relatively high temperature environments, hydrocarbon fuel such as kerosene (e.g., jet fuel) can coke. Such coking may reduce or block fuel flow and/or otherwise degrade fuel system operation. Hydrocarbon fuel therefore may not be suitable for cooling high temperature components within a turbine engine such as, but not limited to, a combustor wall, a shroud, a blade outer air seal (BOAS), and the like.

Figure 4:
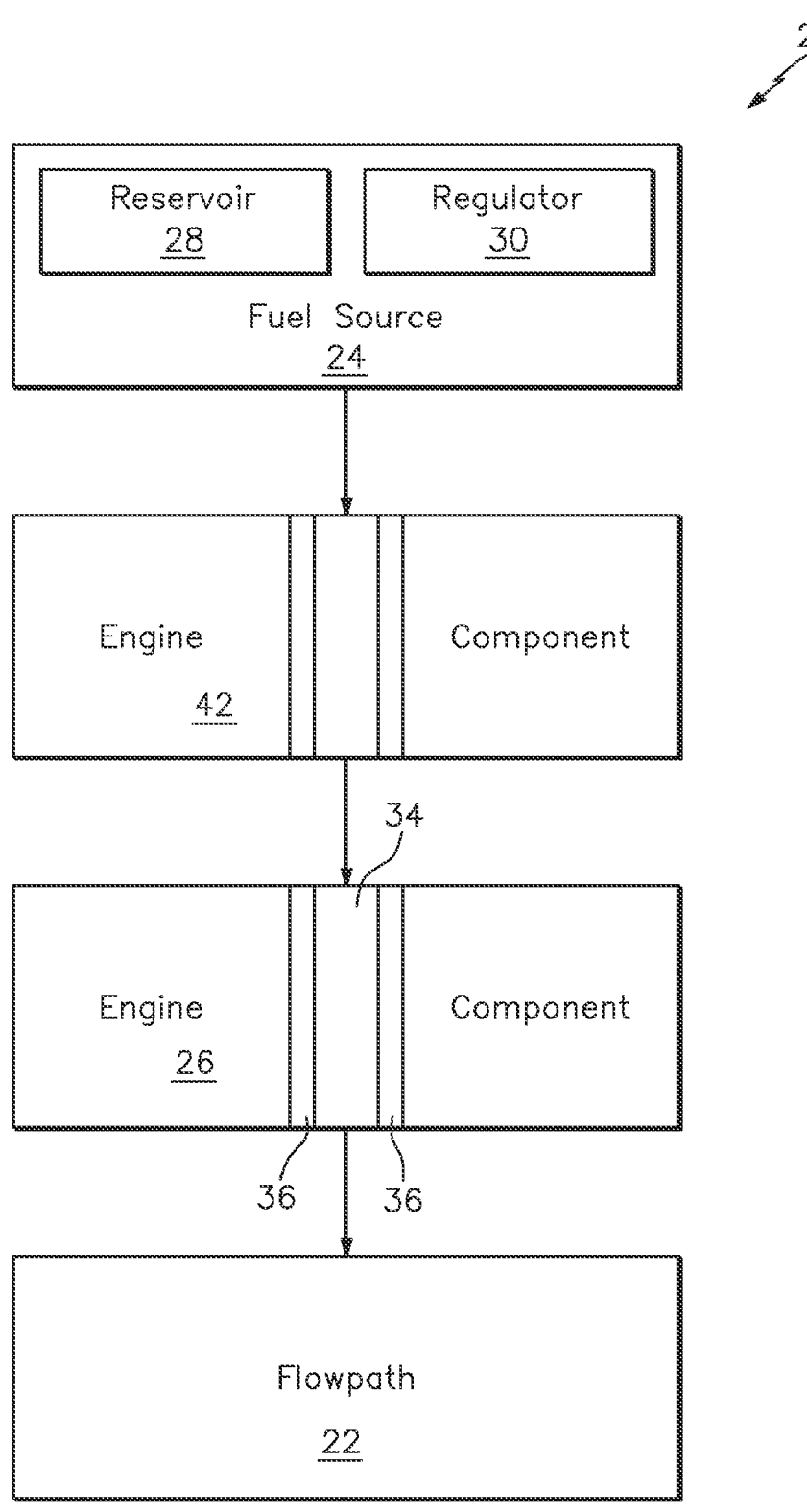
FIG. 4 is a schematic illustration of the turbine engine assembly with upstream and downstream fuel-cooled engine components.

In some embodiments, referring still to FIG. 1, the engine component 26 may receive the fuel in the liquid phase as described above. In other embodiments, the engine component 26 may receive the fuel in the gaseous phase. The fuel stored in the fuel reservoir 28, for example, may be vaporized fuel. Alternatively, referring to FIG. 4, another engine component 42 (e.g., another fuel-cool component of the turbine engine, or a fuel vaporizer) may be arranged between the fuel source 24 and the engine component 26. The upstream engine component 42 may be cooled by heating the fuel and vaporizing the fuel. The downstream engine component 26 may be cooled by heating the vaporized fuel and/or at least partially (or completely) cracking the vaporized fuel. Of course, in other embodiments, each of the engine components 26 and 42 may heat, vaporize and/or crack at least some of the fuel flowing therewithin.

In some embodiments, referring to FIG. 1, the engine component 26 may be configured to at least partially (or completely) crack the fuel as described above. In other embodiments, however, the engine component 26 may be configured to heat the fuel and/or vaporize the fuel without, for example, cracking the fuel. In such embodiments, the turbine engine assembly 20 may direct (e.g., primarily or only uncracked) vaporized fuel (e.g., gaseous $NH_3$, gaseous $H_2$, etc.) into the flowpath 22 for combustion.

Figure 5:
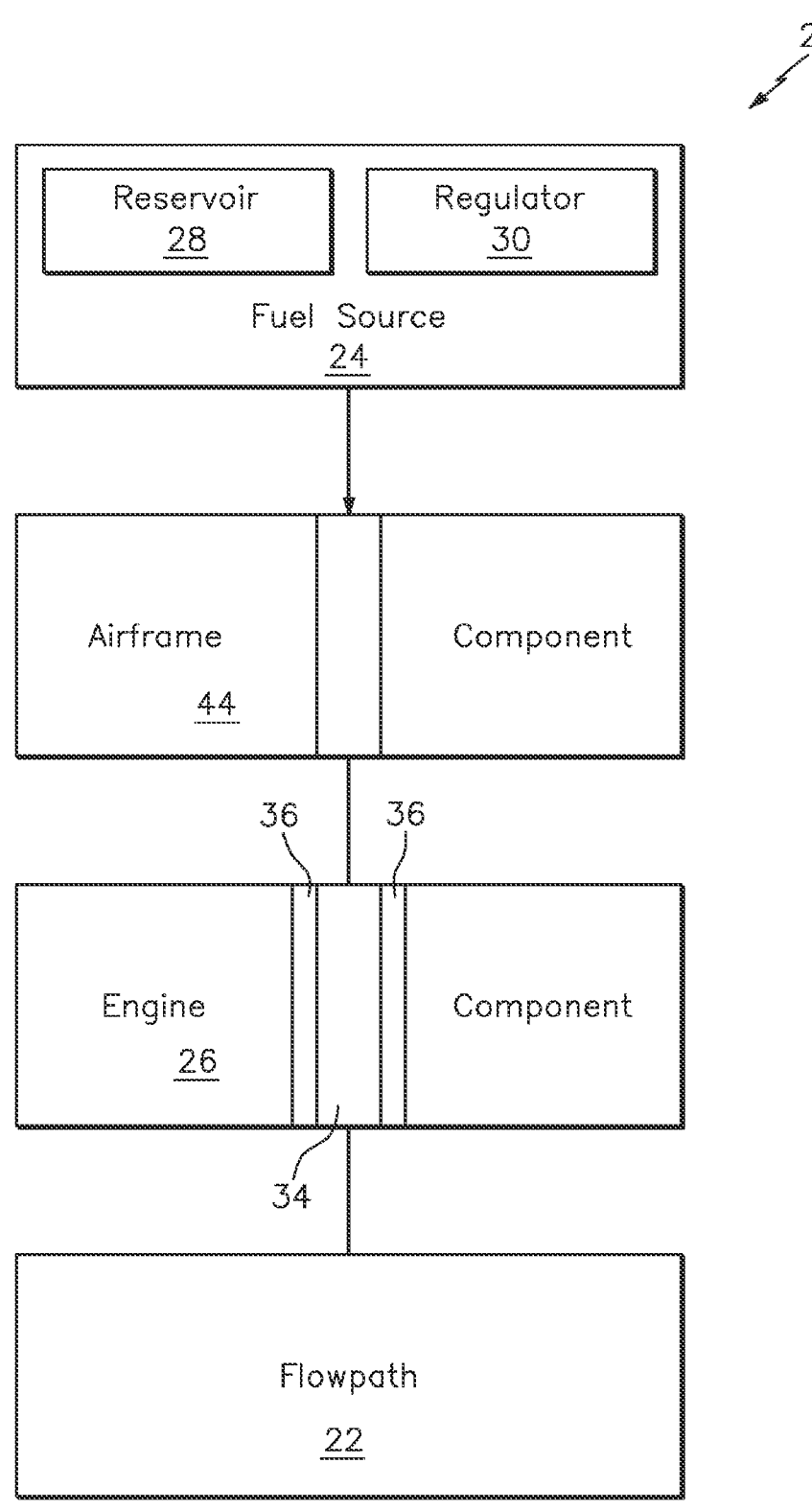
FIG. 5 is a schematic illustration of the turbine engine assembly configured with an airframe component in an upstream position.
Figure 6:
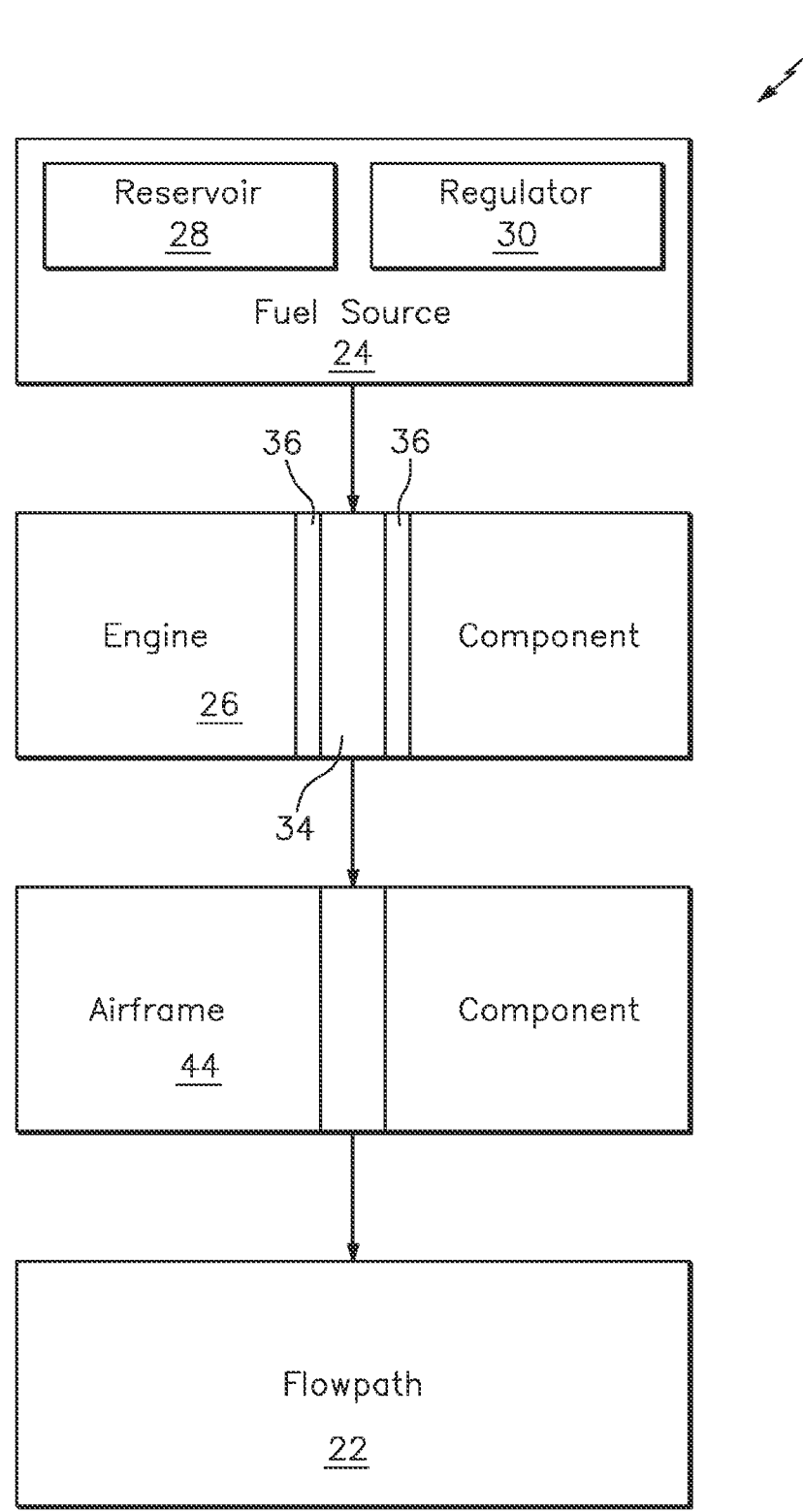
FIG. 6 is a schematic illustration of the turbine engine assembly configured with the airframe component in a downstream position.

In some embodiments, referring to FIGS. 5 and 6, the fuel circuit may be used for cooling and/or heating components and/or internal volumes (e.g., a cabin compartment, etc.) in device(s) or system(s) outside of the turbine engine; e.g., an airframe of an aircraft propelled by and/or powered by the turbine engine. For example, referring to FIG. 5, an airframe component 44 (e.g., a component of a cabin environmental control system such as, but not limited to, a heat exchanger within the airframe) may be fluidly coupled inline between the fuel source 24 and the engine component 26. With such a configuration, the airframe component 44 may be cooled by the fuel (e.g., functioning as refrigerant) flowing therethrough. Alternatively, referring to FIG. 6, the airframe component 44 may be fluidly coupled inline between the engine component 26 and the output to the flowpath 22. With such a configuration, the airframe component 44 may be heated by the fuel flowing therethrough. Still alternatively, a valve system may be included to selectively routing the fuel, for example, as shown in FIG. 5 or as shown in FIG. 6 depending upon airframe needs; e.g., heat the airframe component 44 when it is cold outside and cool the airframe component 44 when it is hot outside.

Figures 7, 8, 9:
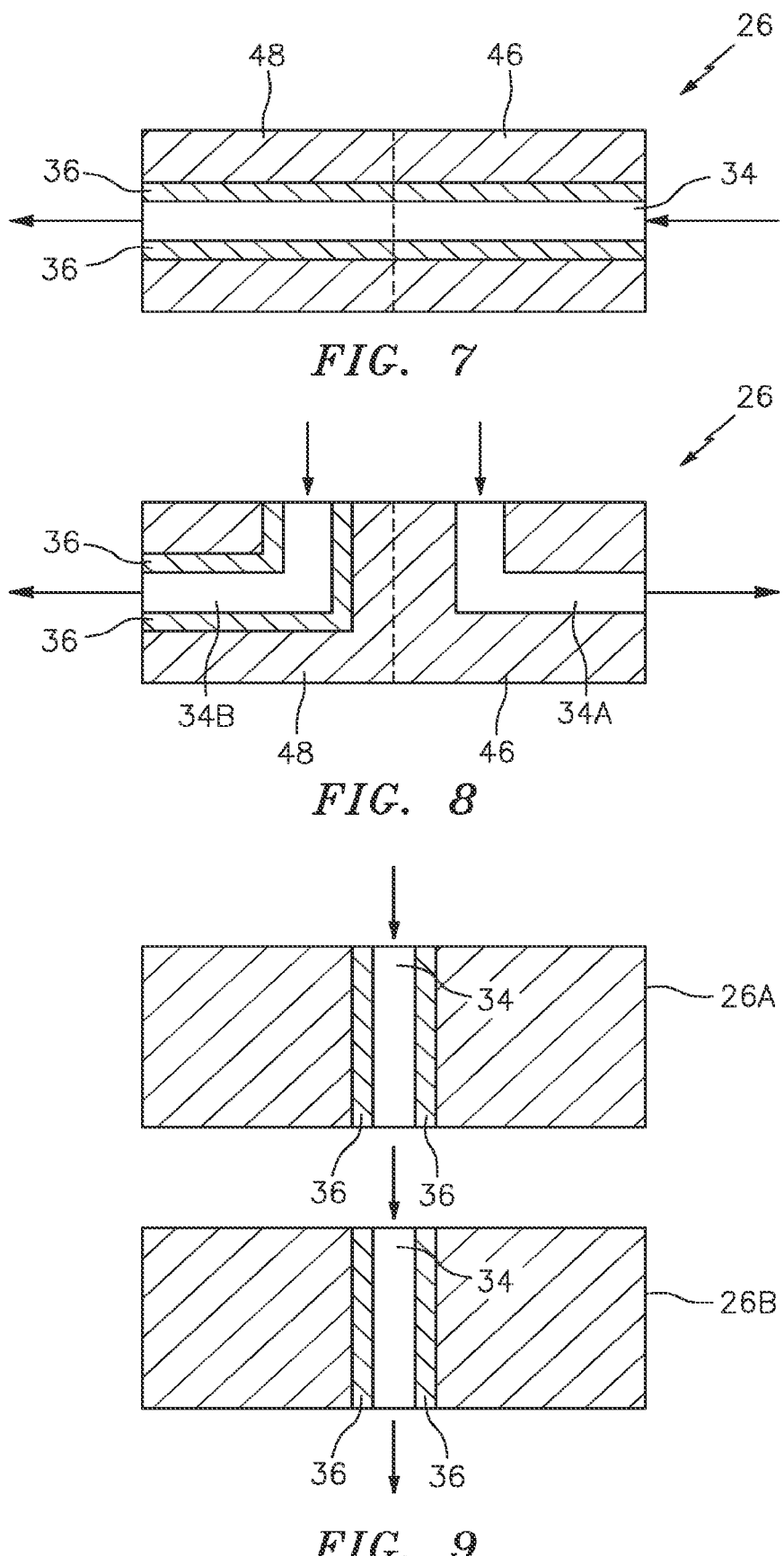
FIG. 7 is a schematic illustration of the fuel-cooled engine component with hot and cool regions.
FIG. 8 is a schematic illustration of the fuel-cooled engine component with multiple discrete (e.g., parallel) internal passages.
FIG. 9 is a schematic illustration of a plurality of serially arranged fuel-cooled engine components.

In some embodiments, referring to FIGS. 7 and 8, the fuel may be provided to the engine component 26 to selectively cool that component. For example, heat transfer associated with heating the liquid fuel may be less than heat transfer associated with heating the vaporized fuel. Therefore, referring to FIG. 7, fuel may be directed through the internal passage 34 such that the fuel is in its liquid phase at (e.g., in, adjacent or proximate) a relatively cold region 46 of the engine component 26, and the fuel is in its gaseous phase at a relatively hot region 48 of the engine component 26. Alternatively, referring to FIG. 8, one internal passage 34A within the engine component 26 at the relatively cold region 46 may receive liquid fuel, whereas another internal passage 34B within the engine component 26 at the relatively hot region 48 may receive the vaporized fuel. In still other embodiments, a plurality of engine components 26A and 26B (generally referred to as "26") that are cooled by the fuel may be staged as shown, for example, in FIG. 9. The upstream engine component 26A, for example, may receive the liquid fuel and may be relatively cool whereas the downstream engine component 26B may receive at least some or all of the vaporized fuel and may be relatively hot.

Of course, in other embodiments, each of the engine components 26 may heat, vaporize and/or crack at least some of the fuel flowing therewithin.

Figure 10:
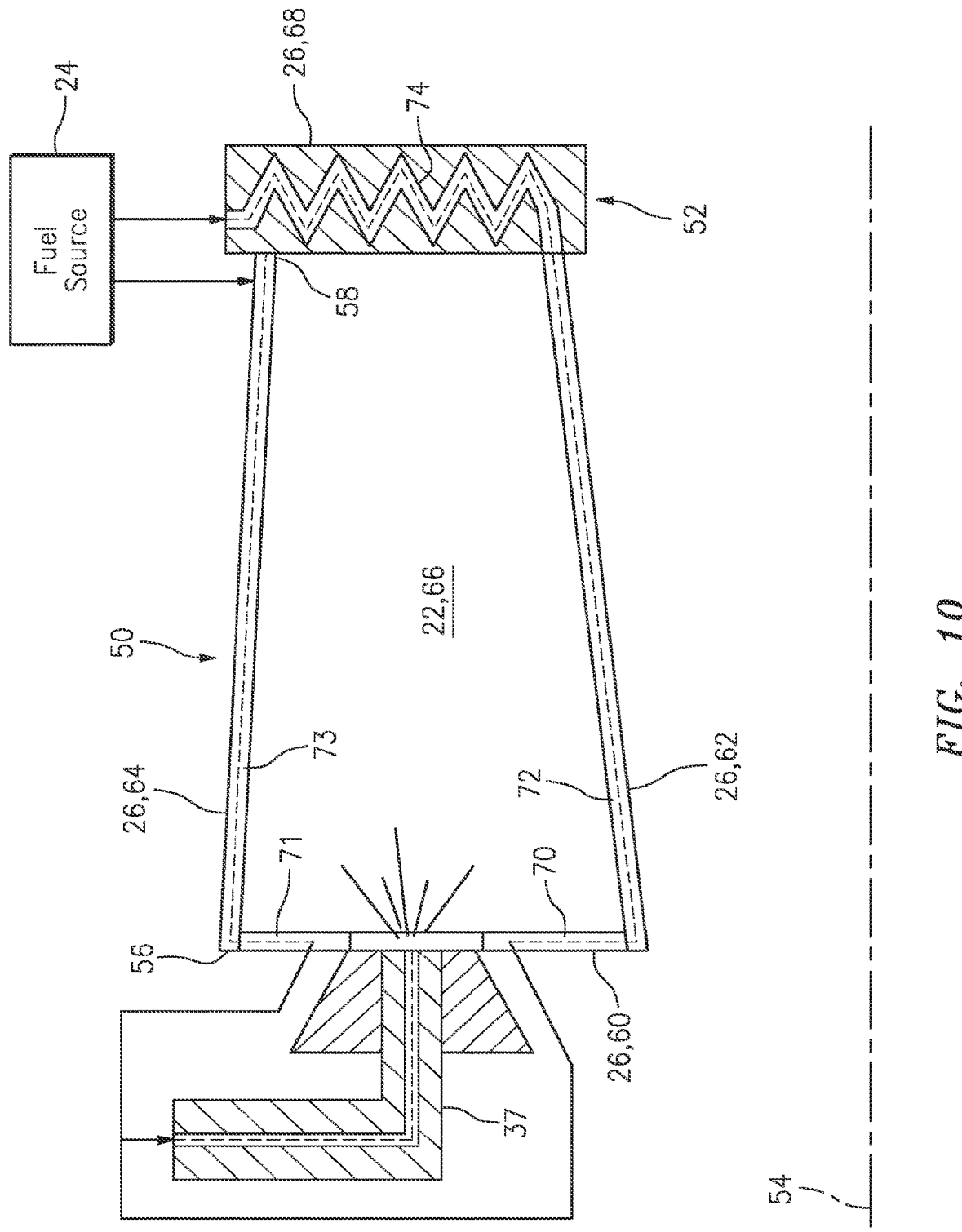
FIG. 10 is a schematic illustration of a portion of a combustor section of the turbine engine.

FIG. 10 illustrates the turbine engine assembly 20 configured with an annular combustor 50 and a vane structure 52; e.g., an inlet turbine nozzle. This combustor 50 extends axially along an axial centerline 54 between a forward, upstream end 56 and an aft, downstream end 58, which axial centerline 54 may be coaxial with a rotational axis of the turbine engine. The combustor 50 extends circumferentially about (e.g., completely around) the axial centerline 54. The combustor 50 of FIG. 10 includes an annular combustor bulkhead 60, a tubular combustor inner wall 62 and a tubular combustor outer wall 64.

The bulkhead 60 is arranged at the forward, upstream end 56 of the combustor 50. The bulkhead 60 extends radially between and is connected to the inner wall 62 and the outer wall 64. The inner wall 62 is connected to and projects axially out from the bulkhead 60 to the aft, downstream end 58 of the combustor 50. The inner wall 62 is positioned radially within the outer wall 64. The outer wall 64 is connected to and projects axially out from the bulkhead 60 to the aft, downstream end 58 of the combustor 50. The outer wall 64 extends circumferentially around (e.g., circumscribes) and axially overlaps the inner wall 62. The bulkhead 60, the inner wall 62 and the outer wall 64 may thereby form the combustion chamber 66; e.g., an annular combustion chamber.

The vane structure 52 is arranged at the aft, downstream end 58 of the combustor 50. This vane structure 52 is configured to direct combustion products produced within the combustion chamber 66 into the turbine section (not visible in FIG. 10). The vane structure 52 of FIG. 10 includes a stator vane array, which array includes a plurality of stator turbine vanes 68 (one visible in FIG. 10) arranged circumferentially about the axial centerline 54.

Any one or more or all of the turbine engine components 60, 62, 64 and/or 68 may each be configured as a fuel-cooled engine component (e.g., 26) as described above. Each of the turbine engine components 60, 62, 64 and/or 68 of FIG. 10, for example, includes at least one respective internal passage 70-74 for flowing the fuel therethrough. The fuel, for example, may be directed sequentially through the outer wall passage 73 and the outer bulkhead passage 71 to the one or more fuel injectors 37 (one visible in FIG. 10) for injection into the combustion chamber 66 for combustion. The fuel may also be directed (in parallel with the above flow) sequentially through the internal passage 74 in one or more of the stator vanes 68, the inner wall passage 72 and the inner bulkhead passage 70 to the one or more fuel injectors 37 for injection into the combustion chamber 66 for combustion. Each of the turbine engine components 60, 62, 64 and/or 68 may be configured to heat, vaporize and/or crack at least some of the fuel prior to injection. Alternatively, the turbine engine components 60, 62, 64 and/or 68 may be configured for staged cooling where, for example, an upstream one of the components heats and vaporizes the fuel and a downstream one of the components heats and at least partially cracks the fuel.

Figure 11:
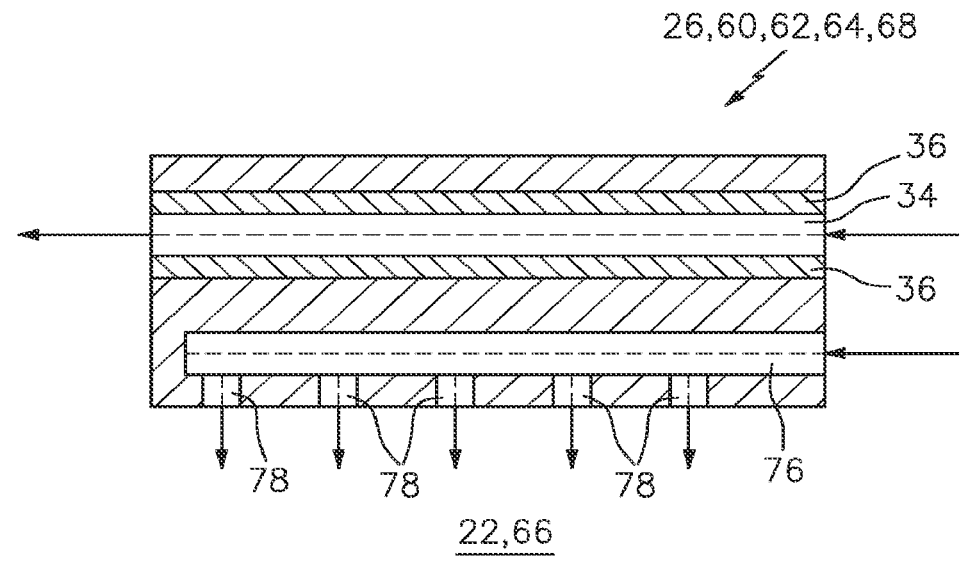
FIG. 11 is a schematic illustration of the fuel-cooled engine component configured with air cooling.

In some embodiments, any one or more or all of the turbine engine components 26 (e.g., 60, 62, 64 and/or 68) may each be configured without gas (e.g., air) cooling. In other embodiments, referring to FIG. 11, any one or more or all of the turbine engine components 26 (e.g., 60, 62, 64 and/or 68) may each be configured with supplemental gas (e.g., air) cooling. The turbine engine component of FIG. 11, for example, includes an additional cooling passage 76 and/or one or more cooling apertures 78 (e.g., effusion apertures, impingement apertures, etc.).

Figure 12:
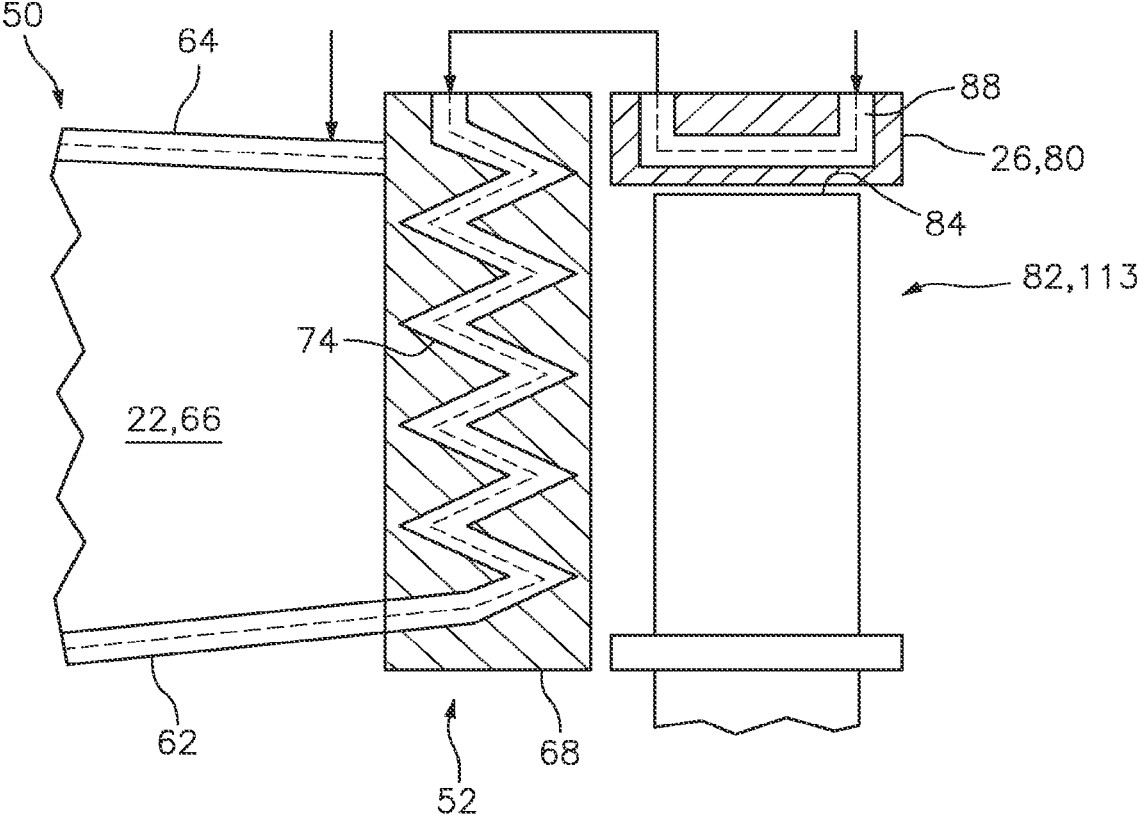
FIG. 12 is a schematic illustration of a portion of the combustor section and a portion of a turbine section of the turbine engine.

FIG. 12 illustrates a portion of the turbine engine assembly 20 configured with a blade outer air seal 80 (BOAS) and a first rotor stage 82 of the turbine section. The blade outer air seal 80 extends circumferentially around (e.g., circumscribes) the first rotor stage 82. The blade outer air seal 80 is arranged in close proximity to turbine blade tips 84 (one visible in FIG. 12) of the first rotor stage 82 to reduce or prevent leakage across those tips 84 during turbine engine operation. The blade outer air seal 80 may be configured as a fuel-cooled engine component 26 as described above. An internal passage 88 (or passages) of the blade outer air seal 80, for example, may be fluidly coupled in line with and between the fuel source 24 and the vane structure 52 and its vane passages 74.

In some embodiments, referring to FIG. 10, the coolant fuel may be the primary or only fuel directed into the flowpath 22 (e.g., the combustion chamber 66) for combustion. However, in other embodiments, the fuel injector 37 may also or alternatively receive additional (e.g., non-coolant) fuel. For example, the fuel injector 37 may also or alternatively receive non-hydrocarbon fuel (e.g., gaseous $H_2$, $N_2$ and/or $NH_3$) via another (e.g., bypass) path from the fuel source 24 or another (e.g., separate) fuel source. The fuel injector 37 may also or alternatively receive hydrocarbon fuel (e.g., kerosene) from another fuel source.

In some embodiments, the flow of fuel used for cooling may be varied based on engine operating conditions, flight conditions and/or environmental conditions. For example, less fuel may be used for cooling where the engine is at a low power setting (e.g., idle) where thermal loads (e.g., cooling requirements) are relatively low. By contrast, more fuel may be used for cooling where the engine is at a high power setting (e.g., aircraft takeoff) where thermal loads (e.g., cooling requirements) are relatively high.

Figure 13:
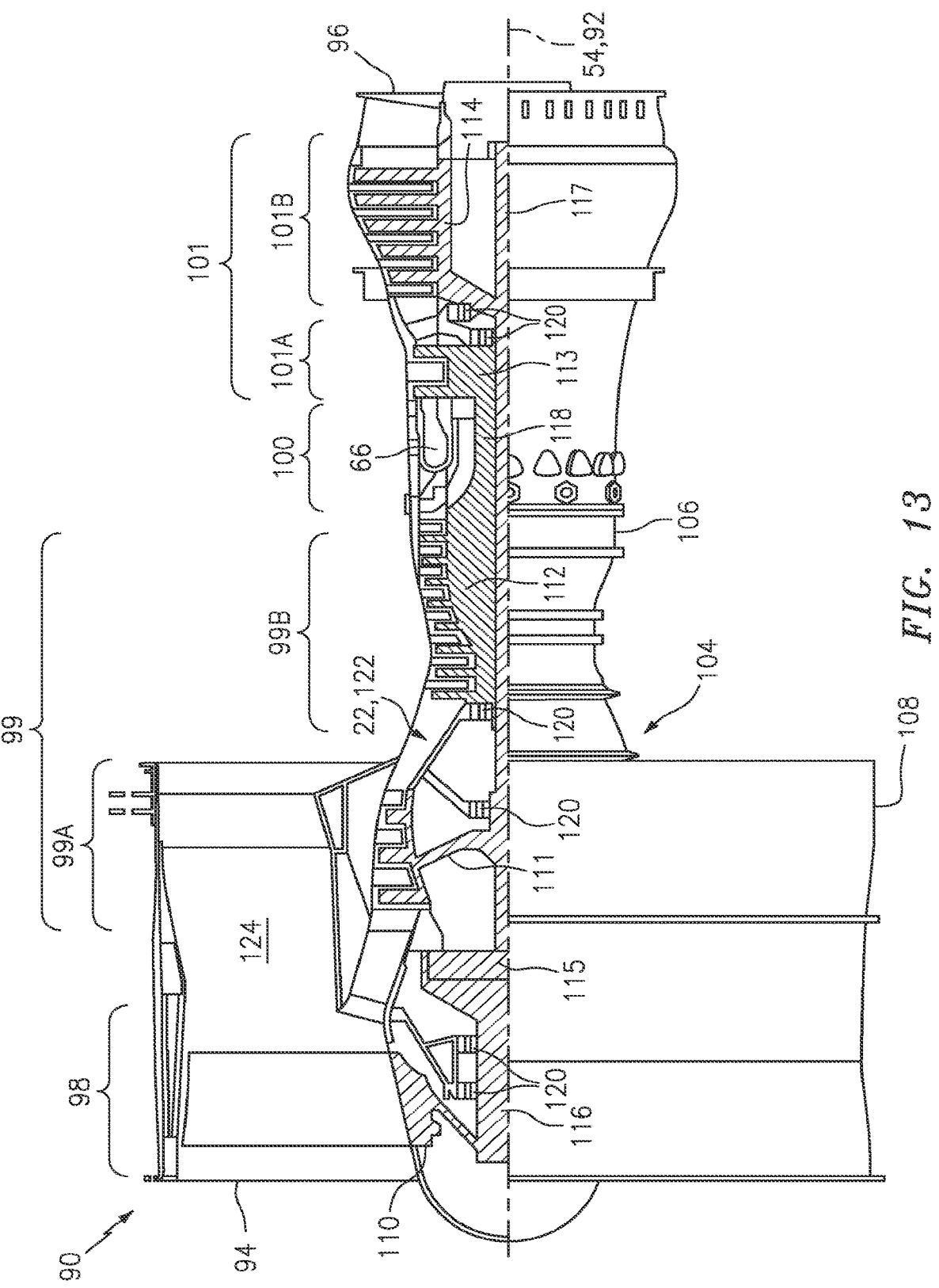
FIG. 13 is a side cutaway illustration of a geared turbine engine.

FIG. 13 a side cutaway illustration of a geared turbine engine 90 with which the turbine engine assemblies 20 described above can be included. This turbine engine 90 extends along an axial centerline 92 (e.g., the centerline 54) between an upstream airflow inlet 94 and a downstream airflow exhaust 96. The turbine engine 90 includes the fan section 98, the compressor section 99, the combustor section 100 and the turbine section 101. The compressor section 99 includes a low pressure compressor (LPC) section 99A and a high pressure compressor (HPC) section 99B. The turbine section 101 includes a high pressure turbine (HPT) section 101A and a low pressure turbine (LPT) section 101B.

The engine sections 98-101 are arranged sequentially along the centerline 92 within an engine housing 104. This housing 104 includes an inner case 106 (e.g., a core case) and an outer case 108 (e.g., a fan case). The inner case 106 may house one or more of the engine sections 99A-101B; e.g., an engine core. The outer case 108 may house at least the fan section 98.

Each of the engine sections 98, 99A, 99B, 101A and 101B includes a respective rotor 110-114. Each of these rotors 110-114 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 110 is connected to a gear train 115, for example, through a fan shaft 116. The gear train 115 and the LPC rotor 111 are connected to and driven by the LPT rotor 114 through a low speed shaft 117. The HPC rotor 112 is connected to and driven by the HPT rotor 113 through a high speed shaft 118. The shafts 116-118 are rotatably supported by a plurality of bearings 120; e.g., rolling element and/or thrust bearings. Each of these bearings 120 is connected to the engine housing 104 by at least one stationary structure such as, for example, an annular support strut.

During operation, air enters the turbine engine 90 through the airflow inlet 94. This air is directed through the fan section 98 and into a core gas path 122 (e.g., the flowpath 22) and a bypass gas path 124. The core gas path 122 extends sequentially through the engine sections 99A-101B. The air within the core gas path 122 may be referred to as "core air". The bypass gas path 124 extends through a bypass duct, which bypasses the engine core. The air within the bypass gas path 124 may be referred to as "bypass air".

The core air is compressed by the compressor rotors 111 and 112 and directed into the combustion chamber 66 in the combustor section 100. The fuel (e.g., the combination of gaseous $H_2$ and gaseous $N_2$, the combination of gaseous $H_2$, gaseous $N_2$ and gaseous $NH_3$, etc.) is injected into the combustion chamber 66 and mixed with the compressed core air to provide a fuel-air mixture. This fuel air mixture is ignited and combustion products thereof flow through and sequentially cause the turbine rotors 113 and 114 to rotate. The rotation of the turbine rotors 113 and 114 respectively drive rotation of the compressor rotors 112 and 111 and, thus, compression of the air received from a core airflow inlet. The rotation of the turbine rotor 114 also drives rotation of the fan rotor 110, which propels bypass air through and out of the bypass gas path 124. The propulsion of the bypass air may account for a majority of thrust generated by the turbine engine 90 of FIG. 13, e.g., more than seventy-five percent (75%) of engine thrust. The turbine engine 90 of the present disclosure, however, is not limited to the foregoing exemplary thrust ratio.

The turbine engine assembly 20 may be included in various turbine engines other than the one described above. The turbine engine assembly 20, for example, may be included in a geared turbine engine where a gear train connects one or more shafts to one or more rotors in a fan section, a compressor section and/or any other engine section. Alternatively, the turbine engine assembly 20 may be included in a turbine engine configured without a gear train. The turbine engine assembly 20 may be included in a geared or non-geared turbine engine configured with a single spool, with two spools (e.g., see FIG. 13), or with more than two spools. The turbine engine may be configured as a turbofan engine, a turbojet engine, a propfan engine, a pusher fan engine or any other type of turbine engine. The present disclosure therefore is not limited to any particular types or configurations of turbine engines.

The present disclosure is not limited to aircraft thrust applications. The turbine engine, for example, may alternatively be configured as an auxiliary power unit (APU) for the aircraft, a (e.g., industrial) turbine engine for power generation, etc. Furthermore, the present disclosure is not limited to turbine engine applications. For example, in other embodiments, the assembly 20 may be configured for another type of engine such as, but not limited to, an (e.g., rotary or reciprocating piston) internal combustion (IC) engine, etc.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a turbine engine with a flowpath, comprising:
   a fuel source; and
   an engine component forming a peripheral boundary of the flowpath, the engine component comprising a component internal passage, the engine component configured to receive fuel from the fuel source, and the engine component configured to crack at least some of the fuel within the component internal passage thereby cooling the engine component and providing at least partially cracked fuel; and
   a turbine vane comprising a vane internal passage that is fluidly coupled with the component internal passage, wherein the vane internal passage includes a non-linear internal passage that directs the fuel radially inward along a radial length of the turbine vane,
   wherein the vane internal passage includes a plurality of turns along the radial length, the plurality of turns are aligned along a longitudinal direction of the turbine engine, such that the fuel flows alternately downstream and upstream the longitudinal direction through the plurality of turns;
   wherein the assembly is configured to direct the at least partially cracked fuel into the flowpath for combustion.

2. The assembly of claim 1, wherein the at least partially cracked fuel comprises hydrogen gas.

3. The assembly of claim 1, wherein
   the fuel comprises ammonia; and
   the at least partially cracked fuel comprises hydrogen gas and nitrogen gas.

4. The assembly of claim 1, wherein the engine component comprises a catalytic material at least partially lining the component internal passage, and the catalytic material is selected to facilitate the cracking of the at least some of the fuel within the component internal passage.

5. The assembly of claim 1, wherein the engine component comprises material that at least partially forms the component internal passage, and the material comprises at least one of nickel (Ni), iron (Fe), ruthenium (Ru) or platinum (Pt).

6. The assembly of claim 1, wherein
   the fuel directed into the component internal passage comprises liquid fuel;
   the engine component is configured to vaporize the liquid fuel to provide vaporized fuel; and
   the engine component is further configured to crack at least some of the vaporized fuel to provide the at least partially cracked fuel.

7. The assembly of claim 1, wherein
   the fuel directed into the component internal passage comprises vaporized fuel; and
   the engine component is configured to crack at least some of the vaporized fuel to provide the at least partially cracked fuel.

8. The assembly of claim 1, wherein the engine component comprises a flowpath wall.

9. The assembly of claim 1, wherein the engine component comprises a blade outer air seal.

10. The assembly of claim 1, further comprising:

a combustor comprising a combustion chamber, wherein the combustion chamber forms part of the flowpath;

the assembly configured to direct the at least partially cracked fuel into the combustion chamber for combustion.

11. The assembly of claim 10, wherein the combustor comprises a fuel injector; and the fuel injector is configured to direct the at least partially cracked fuel into the combustion chamber for combustion.

12. The assembly of claim 10, wherein the combustor comprises the engine component;

the engine component is configured as a combustor wall; and the combustor wall comprises one or more fuel injection orifices configured to direct the at least partially cracked fuel into the combustion chamber for combustion.

13. The assembly of claim 10, wherein:

the turbine vane is adjacent the combustor;

the vane internal passage fluidly couples the fuel source with the component internal passage; and the engine component is configured as an inner wall of the combustor.

14. The assembly of claim 1, further comprising an airframe component comprising an airframe internal passage that is fluidly coupled with the fuel source and the component internal passage.

15. An assembly for a turbine engine with a flowpath, comprising:

a fuel source;

an engine component forming a peripheral boundary of the flowpath, the engine component comprising a component internal passage, and the engine component configured to receive fuel from the fuel source and flow the fuel within the component internal passage for cooling the engine component; and a turbine vane comprising a vane internal passage that is fluidly coupled with the component internal passage, wherein the vane internal passage includes a non-linear internal passage along a radial length of the turbine vane, wherein the vane internal passage includes a plurality of turns along the radial length, the plurality of turns are aligned along a longitudinal direction of the turbine engine, such that the fuel flows alternately downstream and upstream the longitudinal direction through the plurality of turns;

wherein the assembly is configured to direct the fuel used for cooling the engine component from the engine component into the flowpath for combustion, and the fuel directed into the flowpath comprises hydrogen gas.

16. The assembly of claim 15, wherein the engine component is configured to crack at least some of the fuel within the component internal passage to provide at least partially cracked fuel, and the at least partially cracked fuel comprises the hydrogen gas.

17. An assembly for a turbine engine, comprising:

a fuel source, a turbine vane and an annular combustor;

the turbine vane comprising a vane internal passage, wherein the vane internal passage includes a non-linear internal passage along a radial length of the turbine vane, wherein the vane internal passage includes a plurality of turns along the radial length, the plurality of turns are aligned along a longitudinal direction of the turbine engine;

the annular combustor comprising a combustion chamber and a combustor inner wall, and the combustor inner wall comprising an inner wall internal passage;

the assembly configured to direct fuel from the fuel source sequentially through the vane internal passage and the inner wall internal passage, such that the fuel flows alternately downstream and upstream the longitudinal direction through the plurality of turns to cool the turbine vane and the combustor inner wall; and the assembly configured to direct the fuel used for cooling the turbine vane and the combustor inner wall into the combustion chamber for combustion.

18. The assembly of claim 17, wherein the annular combustor further includes a combustor outer wall that circumscribes the combustor inner wall;

the combustor outer wall comprises an outer wall internal passage;

the assembly is configured to direct additional fuel from the fuel source through the outer wall internal passage to cool the combustor outer wall; and the assembly is configured to direct the additional fuel used to cool the combustor outer wall into the combustion chamber for combustion.

19. The assembly of claim 17, wherein at least one component of the assembly is configured to crack at least some of the fuel flowing therethrough to provide at least partially cracked fuel, and the assembly is configured to direct the at least partially cracked fuel into the combustion chamber for combustion; and the at least one component of the assembly is configured as the turbine vane or the combustor inner wall.

* * * * *